Feb. 4, 1964 J. LYONS 3,120,221
PNEUMATIC VALVE RETURN FOR INTERNAL COMBUSTION ENGINES
Filed Feb. 13, 1962

INVENTOR.
JIM LYONS
BY
Knox & Knox

United States Patent Office 3,120,221
Patented Feb. 4, 1964

3,120,221
PNEUMATIC VALVE RETURN FOR INTERNAL
COMBUSTION ENGINES
Jim Lyons, 5104 Harbor Drive, San Diego 6, Calif.
Filed Feb. 13, 1962, Ser. No. 173,062
5 Claims. (Cl. 123—90)

The present invention relates generally to valve actuating means and more particularly to pneumatic valve return for internal combustion engines.

The primary object of this invention is to provide valve return means wherein the valves of an internal combustion engine are closed by pressurized air, thereby eliminating the floating action inherent in valve springs at very high speeds.

Another object of this invention is to provide pneumatic valve return means incorporating positive and accurate valve adjustment with secure locking, the mechanism being readily accessible and requiring the minimum removal of engine parts.

Another object of this invention is to provide pneumatic valve return means in which the compressed air assists in cooling the exhaust valves.

A further object of this invention is to provide pneumatic valve return means which is adaptable to many types of existing engines and which utilizes the conventional camshaft valve actuating means.

Finally, it is an object to provide pneumatic valve return means of the aforementioned character which is simple and convenient to manufacture and install and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

*General Structure*

Figure 1:
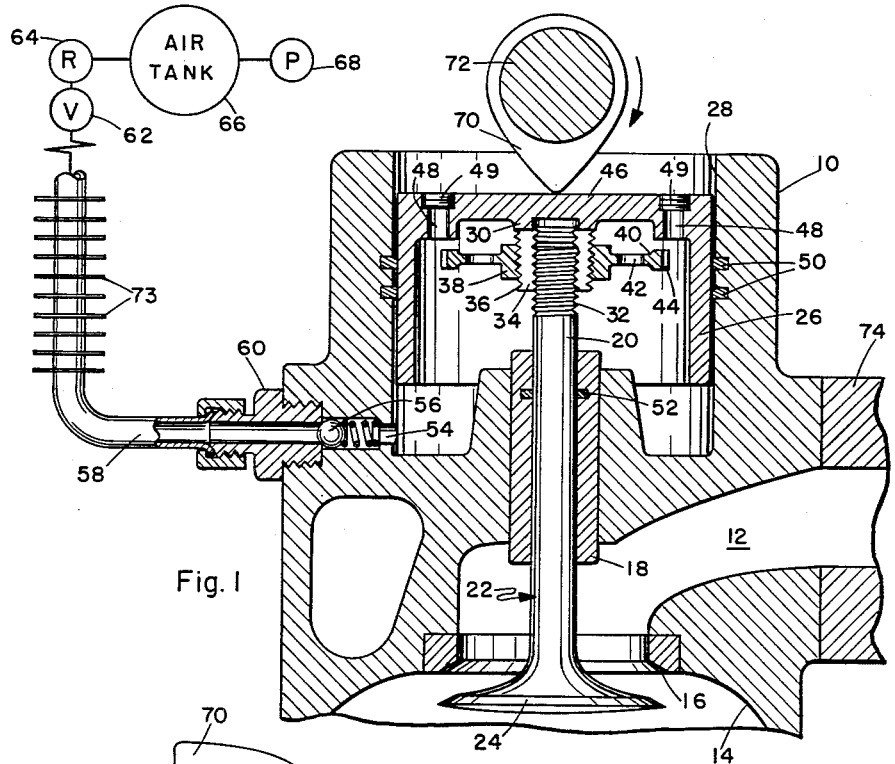
FIGURE 1 is an axial sectional view of a single valve unit incorporating the pneumatic return means, the valve being in open position.

The valve return mechanism is incorporated into the cylinder head 10 of an internal combustion engine, not shown, various arrangements thereof being well known. A single valve assembly is illustrated but the mechanism is similar at each intake and exhaust valve. The head 10 has a port 12 leading into cylinder 14, the opening of the port into the cylinder being fitted with a valve seat 16 of conventional type. Fixed in head 10 coaxially with the valve seat 16 is a valve guide 18, in which is slidably mounted the stem 20 of a valve 22, the head 24 of said valve fitting closely into said seat. Thus far the structure is basically conventional.

Instead of using a spring to close the valve, the end of valve stem 20 is secured to a valve lifting piston 26 slidable in a valve cylinder 28 in the outer portion of head 10. The piston 26 has an internally threaded boss 30 into which the threaded end 32 of valve stem 20 is screwed, the boss being diametrically slotted, as indicated at 34, and having a tapered external thread 36. Mounted on boss 30 is a lock nut 38 also having a tapered thread, so that tightening of said lock nut clamps the boss on valve stem 20 in the manner of a collet. Lock nut 38 has a radially extended disc portion 40 with openings 42 and having a peripheral ring gear 44. Extending through the top face 46 of piston 26 are a pair of diametrically opposed access holes 48, which are radially spaced to align with the teeth of ring gear 44 and are normally closed by threaded plugs 49. Valve cylinder 28 may be fitted with rings 50 to seal against piston 26 or, if head 10 is of hardened material, or said valve cylinder is provided with a liner, the rings can be incorporated into the piston. Also, a sealing ring 52 may be fitted inside valve guide 18 if necessary, although this will normally be required only for intake valves, as will hereinafter be apparent.

In the lower portion of valve cylinder 28 is an inlet 54 fitted with a non-return valve 56 to admit air to the cylinder but prevent leakage. An air supply pipe 58 is connected to head 10 by a suitable connection 60 of conventional type. The supply pipe 58 leads through a shut-off valve 62 and a pressure regulator 64 to a pressure reservoir or tank 66, which is charged by an engine driven compressor 68, all indicated diagrammatically in FIGURE 1. Conventional components may be used and arranged to suit a particular engine installation.

*Operation*

Except for the head and valve assembly, the engine is conventional and each valve is opened by the usual cam 70 on an engine driven camshaft 72, FIGURE 1 illustrating the fully open position of the valve 22. The valve cylinder 28 is filled with pressurized air, the pressure being maintained by the pressure tank 66 and controlled by regulator 64. Thus when the piston 26 is pushed down the trapped air is further compressed and acts as a resilient cushion, since the non-return valve 56 will not permit any air to escape. Consequently, upon continued rotation of the cam 70, the piston 26 will be forced upwardly by air pressure to close valve 22. The openings 42 in disc portion 40 allow the air to pass through freely to the face of the piston and also reduce the weight of the moving assembly. The action is very rapid and positive without any floating or harmonic action inherent in springs at high rotational speeds. The system is thus applicable to competition or racing engines which are required to operate reliably at high speeds and for which spring returned valves are generally unsatisfactory. Some engines use positive valve return mechanisms such as the desmodromic actuators, but these are complex and difficult to adjust. The pneumatic system can be controlled by regulating the air pressure for most efficient operation at the required speed.

As a secondary feature, the compressed air assists in cooling the exhaust valves. The firm contact between valve 22 and piston 26 ensures good conduction of heat from the valve to the piston and the considerable area of the piston 26 disperses heat effectively. In the case of exhaust valves, a slight leakage of the pressurized air between the valve stem 20 and valve guide 18 will not be detrimental and will further the cooling action. The intake valves, however, may need the sealing rings 52 to prevent dilution of the carefully controlled fuel and air mixture. In engine construction the normal small clearances will in any event, ensure that any such leakage is minimal. If desired, fins 73 or the like may be added to a portion of supply pipe 58 to assist in cooling the air.

*Valve Adjustment*

Figure 2:
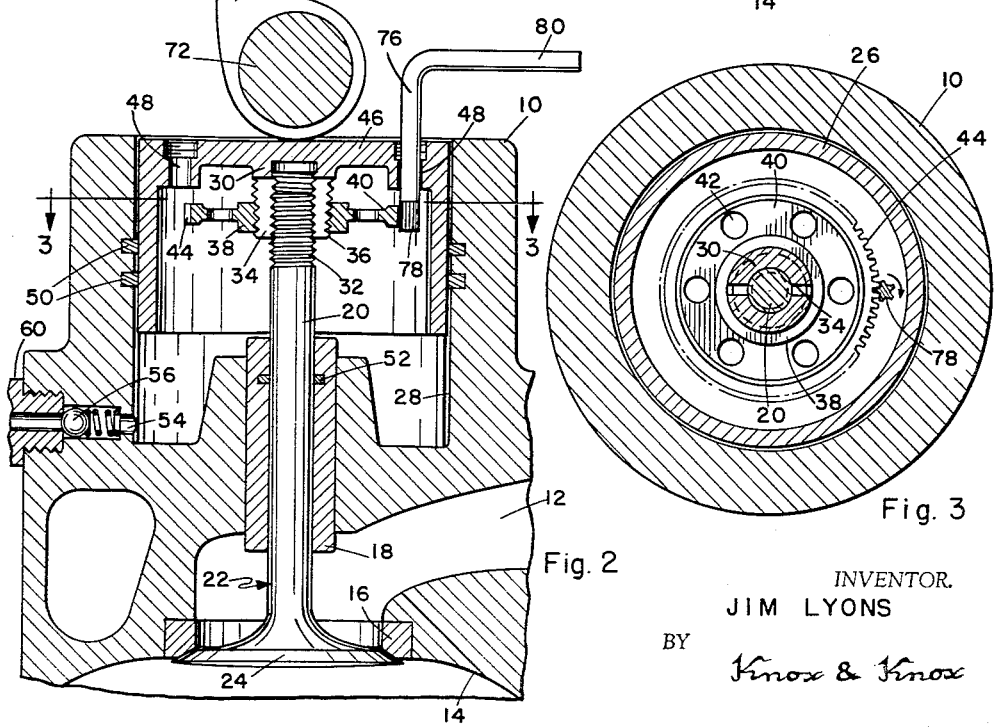
FIGURE 2 is a sectional view similar to FIGURE 1, but with the valve closed and showing the means for locking the valve after adjustment.
Figure 3:
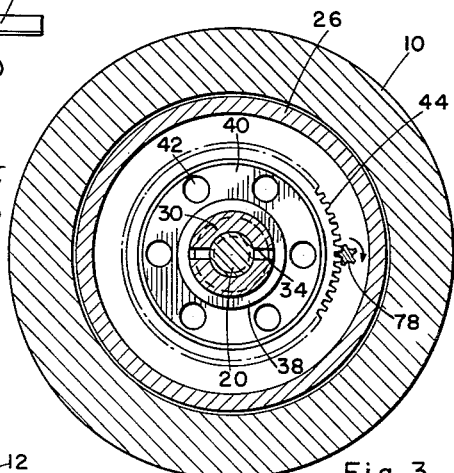
FIGURE 3 is a sectional view taken on line 3—3 of FIGURE 2.

To adjust a valve, access is required to the valve stem or head, so the head 10 can be removed from the engine to expose the valve, or the appropriate manifold, indicated at 74, can be removed from the head. The plugs 49 are removed to open the access holes 48 and a special wrench 76 or wrenches are inserted through one or both access holes. Wrench 76 is a simple rodlike tool having at one end a toothed pinion 78 which meshes with the ring gear 44, as in FIGURE 2, the other end having a laterally extending handle 80 for leverage. Use of two wrenches on opposite sides of ring gear 44 reduces loads, but one wrench will suffice in most cases. By turning wrench 76 the lock nut 38 can be loosened, allowing valve 22 to be turned and adjusted to the required clearance. Alternatively valve 22 can be held by the fingers or a suitable gripping tool and the piston 26 turned by means of an ordinary spanner wrench in the access holes 48 which act as sockets for the spanner wrench. When the correct setting is obtained, the lock nut 38 is again tightened by wrench 76 to clamp the split boss 30 and lock the valve in place relative to piston 26. Plugs 49 are then replaced to seal the piston.

The system is especially useful in high speed engines capable of operating at speeds from 7,000 to 10,000 r.p.m. or higher, although the structure is applicable to many types of engines. No special materials or manufacturing techniques are necessary and actual parts are kept to a minimum. A simple wrench is used for valve adjustment as opposed to spring compressors and other tools required for conventional systems.

The engine will not run without a ready compressed air supply to close the valves, but the shut-off valve 62 allows air to be stored in tank 66 after an engine run, in preparation for re-starting.

It is understood that minor variation from the form of the invention disclosed herein may be made without departure from the spirit and scope of the invention, and that the specification and drawings are to be considered as merely illustrative rather than limiting.

I claim:

1. Pneumatic valve return means for an internal combustion engine, comprising:
   a cylinder head;
   a valve seat in said head;
   a valve axially slidably mounted relative to said seat and having a head portion to fit closely in the seat;
   a cylinder in said head;
   said valve having a stem extending axially into said cylinder;
   a lifting piston secured to said stem and being slidable in said cylinder;
   said valve stem being threadedly connected to said piston and said piston having means to lock the connection therebetween; said threaded connection being of a length to provide for adjustment and said threaded connection and locking means being on the cylinder head side of the piston;
   means to open said valve clear of said seat;
   and a source of compressed air connected to said cylinder to lift said piston and close said valve.

2. Valve actuating means for an internal combustion engine, comprising:
   a cylinder head;
   a valve seat in said head;
   a valve axially slidably mounted relative to said seat and having a head portion to fit closely in the seat;
   a cylinder in said head;
   said valve having a stem extending axially into said cylinder;
   a lifting piston secured to said stem and being slidable in said cylinder;
   said valve stem being threadedly connected to said piston;
   a lock nut on said piston to lock said valve stem relative thereto; said threaded connection being of a length to provide for adjustment and said threaded connection and lock nut being on the cylinder head side of the piston;
   and said piston having a sealable access hole adjacent said lock nut for insertion of a wrench.

3. Valve actuating means for an internal combustion engine, comprising:
   a cylinder head;
   a valve seat in said head;
   a valve axially slidably mounted relative to said seat and having a head portion to fit closely in the seat;
   a cylinder in said head;
   said valve having a stem extending axially into said cylinder;
   a lifting piston secured to said stem and being slidable in said cylinder;
   said piston having a central boss into which said valve stem is threadedly connected;
   said boss being diametrically split and having an external tapered thread;
   a lock nut on said tapered thread; said threaded connection being of a length to provide for adjustment and said threaded connection and lock nut being on the cylinder head side of the piston;
   and said piston having a sealable hole adjacent said lock nut for insertion of a wrench to adjust said lock nut.

4. Valve actuating means for an internal combustion engine, comprising:
   a cylinder head;
   a valve seat in said head;
   a valve axially slidably mounted relative to said seat and having a head portion to fit closely in the seat;
   a cylinder in said head;
   said valve having a stem extending axially into said cylinder;
   a lifting piston secured to said stem and being slidable in said cylinder;
   said piston having a central boss into which said valve stem is threadedly connected;
   said boss being diametrically split and having an external tapered thread;
   a lock nut on said tapered thread; said threaded connection being of a length to provide for adjustment and said threaded connected and lock nut being on the cylinder head side of the piston;
   said lock nut having a radially extended ring gear integral therewith;
   and said piston having a sealable access hole adjacent the periphery of said ring gear to permit insertion of a gear ended wrench through said access hole for engagement with said ring gear.

5. Valve actuating means for an internal combustion engine, comprising:
   a cylinder head;
   a valve seat in said head;
   a valve axially slidably mounted relative to said seat and having a head portion to fit closely in the seat;
   a cylinder in said head;
   said valve having a stem extending axially into said cylinder;
   a lifting piston secured to said stem and being slidable in said cylinder;
   said piston having a central boss into which said valve stem is threadedly connected;
   said boss being diametrically split and having an external tapered thread;
   a lock nut on said tapered thread; said threaded connection being of a length to provide for adjustment and said threaded connection and lock nut being on the cylinder head side of the piston;
   said lock nut having a radially extended ring gear integral therewith;
   said piston having diametrically opposed sealable access holes adjacent the periphery of said ring gear to permit insertion of a gear ended wrench through either of said access holes for engagement with said ring gear;
   and said access holes constituting spanner wrench sockets for rotational adjustment of said piston relative to said valve.

References Cited in the file of this patent

UNITED STATES PATENTS

| | | |
|---|---|---|
| 776,708 | Way | Dec. 6, 1904 |
| 885,459 | Engler et al. | Apr. 21, 1908 |
| 1,614,749 | Manville | Jan. 18, 1927 |
| 1,876,160 | Zahodiakin | Sept. 6, 1932 |
| 1,987,239 | Lochrane | Jan. 8, 1935 |
| 2,342,003 | Meyer | Feb. 15, 1944 |
| 2,954,016 | Leese | Sept. 27, 1960 |
| 3,002,508 | Barker et al. | Oct. 3, 1961 |

FOREIGN PATENTS

| | | |
|---|---|---|
| 646,579 | France | July 16, 1928 |
| 759,147 | Germany | July 26, 1954 |
| 707,131 | Great Britain | Apr. 14, 1954 |